United States Patent [19]

Crandall

[11] Patent Number: 5,282,396
[45] Date of Patent: Feb. 1, 1994

[54] LINK ASSEMBLY

[75] Inventor: Robert M. Crandall, Capac, Mich.

[73] Assignee: U.S. Farathane Corporation, Utica, Mich.

[21] Appl. No.: 988,779

[22] Filed: Dec. 10, 1992

[51] Int. Cl.$^5$ .................. G05G 1/00; B25G 3/10
[52] U.S. Cl. .................. 74/588; 74/579 R; 403/372; 403/375; 403/132; 403/133
[58] Field of Search ............ 74/579 R, 579 E, 579 F, 74/581, 588, 587; 403/132, 372, 133, 135, 365, 375

[56] References Cited

U.S. PATENT DOCUMENTS

| | | | |
|---|---|---|---|
| 1,913,513 | 6/1933 | Rossman et al. | 74/558 |
| 2,305,881 | 12/1942 | Leighton | 403/132 X |
| 3,121,348 | 2/1964 | Reed | 74/588 |
| 3,408,124 | 10/1968 | Melton et al. | 403/133 X |
| 3,700,271 | 10/1972 | Blaurock et al. | 403/372 |
| 3,781,073 | 12/1973 | Jörn et al. | 403/133 |
| 3,909,084 | 9/1975 | Snidar et al. | 403/135 X |
| 3,945,737 | 3/1976 | Herbenar | 403/132 X |
| 4,360,284 | 11/1982 | Brandenburg | 403/135 X |
| 4,887,486 | 12/1989 | Wood | 74/588 |
| 5,165,306 | 11/1992 | Hellon | 74/588 |

FOREIGN PATENT DOCUMENTS 621418 12/1962 Belgium .................. 403/133

3006240 8/1981 Fed. Rep. of Germany ........ 74/588

Primary Examiner—Vinh T. Luong
Attorney, Agent, or Firm—Lalos & Keegan

[57] ABSTRACT

A link assembly connectable to a pair of spaced members and adapted for rotary motion and conical deflection relative to each of the connectable members generally consisting of an elongated, rigid member having a pair of spaced head segments interconnected by an intermediate segment, each of the head segments having an opening therethrough for receiving a connectable member therein, the rigid member further including a pair of identically configured, co-extensively disposed sections mated and rigidly secured together, each of the sections including a pair of spaced head portions interconnected by an intermediate portion, each of the head portions having an opening therethrough registered with an opening in an adjoining head portion of the other section to provide the connectable member receiving opening in one of the head segments, and a bushing disposed in each of the connectable member receiving openings in the head segments of the rigid member, being formed of a thermoplastic polyurethane material and having an opening therethrough providing a cylindrical wall therein, the cylindrical wall having a plurality of dimples.

18 Claims, 2 Drawing Sheets

LINK ASSEMBLY

BACKGROUND OF THE INVENTION

This invention relates to a link assembly and more particularly to a link assembly adapted for use in a wheel suspension system of a vehicle. The invention further contemplates such a link assembly which is capable of both rotary motion and conical deflection relative to a connecting member.

In wheel suspension systems for vehicles, there commonly is provided a number of link assemblies connected to other components in a manner in which the link assemblies are required to be capable of both rotary motion and conical deflection relative to their connected components. Typically, such link assemblies consist of an elongated steel member having a pair of spaced openings therein, rubber bushings disposed in the spaced openings and steel sleeves inserted within the rubber bushings for receiving pins, bolts or studs to connect the link assembly to other components. Because of the low abrasion resistance of rubber, rubber bushings in such applications are required to be bonded to the metallic link assembly. Such bonding, however, creates internal stresses in the rubber bushings during rotary motion of the link assembly relative to the connected components and eventually results in failure of the bushings. Rubber bushings further have the disadvantage of being subject to dry rotting over a period of usage, providing a further cause of failure. It thus has been found to be desirable to provide such a link assembly in which the bushings will not be subjected to internal stresses causing them to tear apart or deterioration over a period of usage.

In addition to the bushing failure problems experienced in such link assemblies, it has been found that the method of forming the rigid member of the assembly consisting of a pair of spaced head segments in which the bushings are mounted and an intermediate connecting segment has been costly. Typically, such members have been formed by stamping or casting the entire member or separately fabricating and welding together the several segments of such members. It thus further has been found to be desirable to provide a method of forming the rigid members of such link assemblies which is more economical than conventional methods used in the prior art.

Accordingly, it is the principal object of the present invention to provide an improved link assembly.

A further object of the present invention is to provide an improved link assembly adapted to interconnect a pair of other components in a manner whereby the link assembly is capable of rotary motion and conical deflection relative to each of the connected components.

A still further object of the present invention is to provide an improved link assembly adapted to interconnect a pair of other components to permit both rotary motion and conical displacement of the link assembly relative to either of the connected components in which bushings interposed between said link assembly and the connected components will not be subjected to internal stress or deterioration over a period of usage resulting in failure.

Another object of the present invention is to provide a link assembly suitable for use in a wheel suspension system of a vehicle which is simple in design, effective in performance and economical to manufacture.

Other objects and advantages of the present invention will become more apparent to those persons having ordinary skill in the art to which the present invention pertains from the following description taken in conjunction with the accompanying drawings wherein:

DESCRIPTION OF THE PREFERRED EMBODIMENTS

Figure 1:
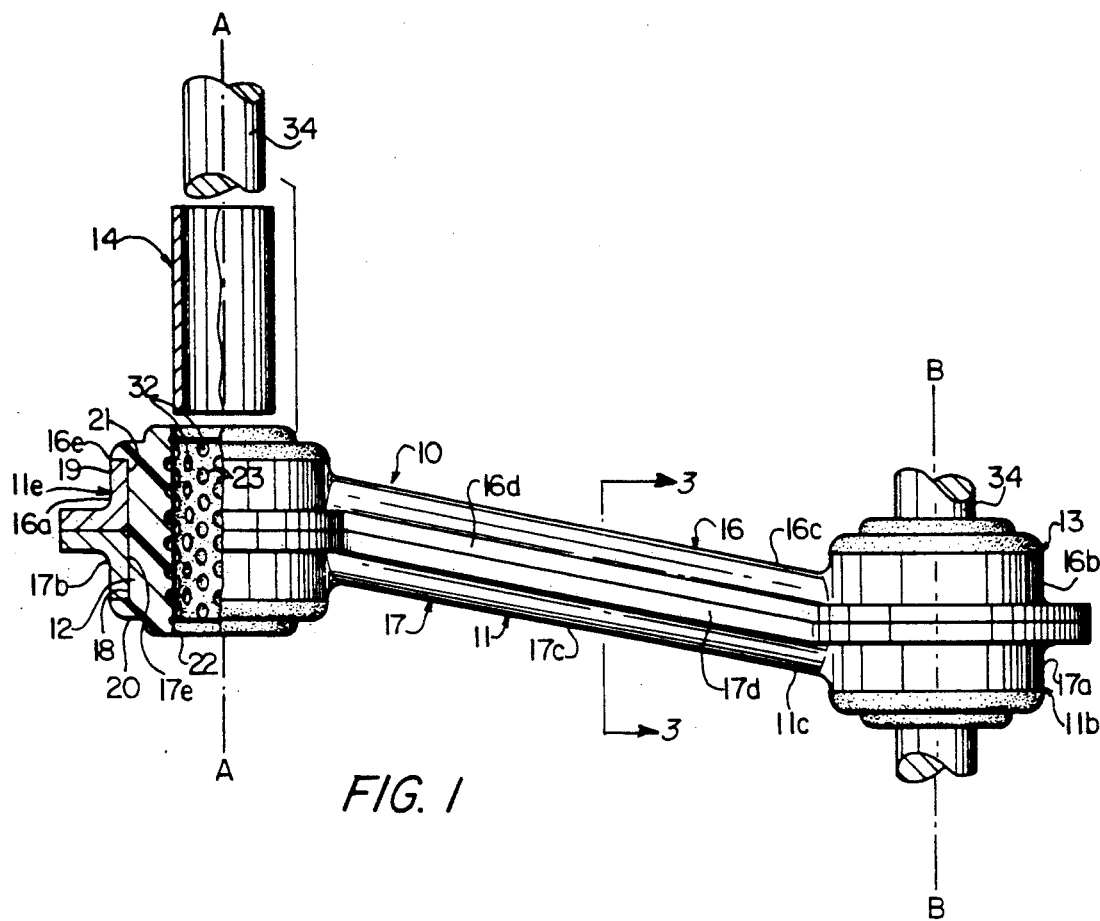
FIG. 1 is a side view of a link assembly embodying the present invention, having a portion thereof shown in vertical cross-section and further illustrating a portion thereof in exploded relation.
Figure 4:
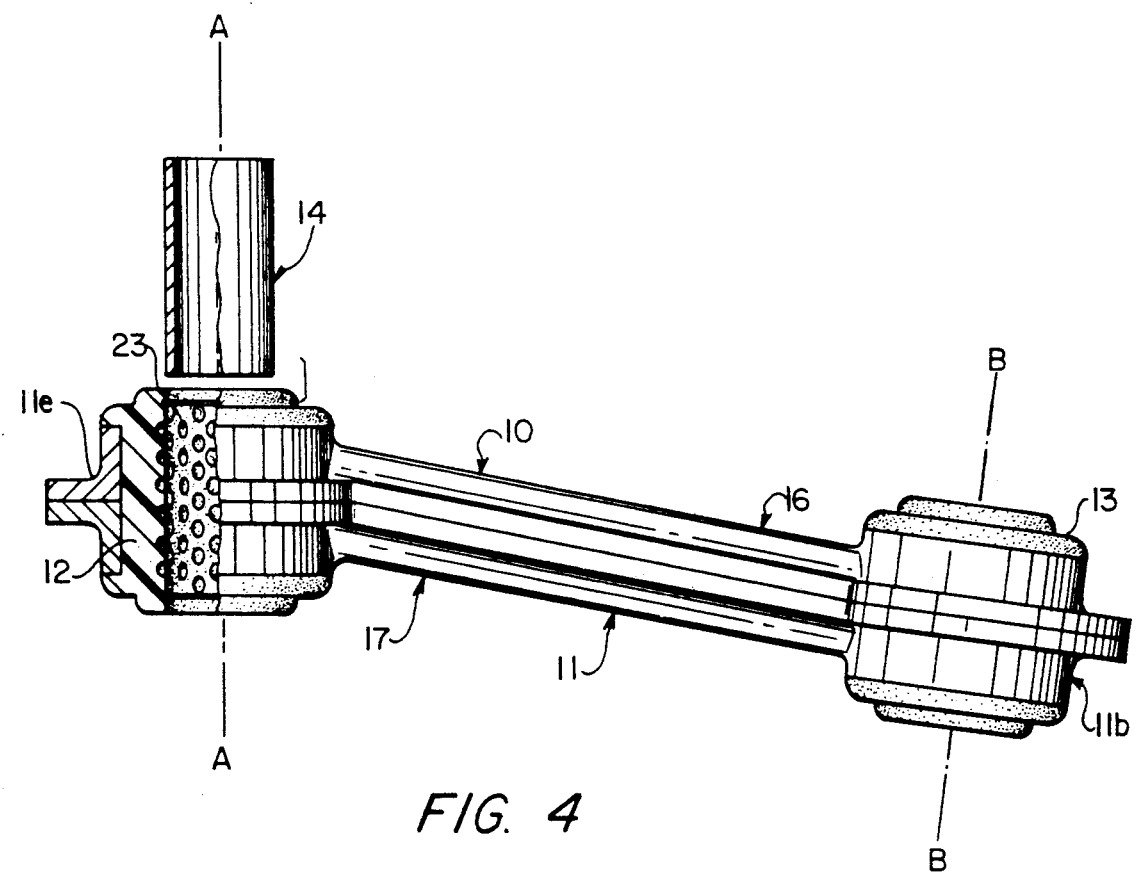
FIG. 4 is a side view of an alternate embodiment of the present invention.

Referring to the drawing, there is illustrated a link assembly 10 generally consisting of an elongated rigid member 11 a pair of bushings 12 and 13 mounted in spaced openings 11a in the elongated rigid member and a pair of sleeve members 14 and 15 disposed within the bushings. The rigid member consists of a pair of spaced head segments 11e and 11b integrally interconnected by an intermediate segment 11c. The head segments of the rigid member may be laterally offset as shown in FIG. 1 or may lie in the same plane, depending upon the particular use of the assembly. In addition, the axes A—A, B—B of the bushing receiving openings 11a in the head segments may be disposed parallel relative to each other as shown in FIG. 1 or may be non-parallel as shown in FIG. 4, again depending on the use of the assembly.

Figure 2:
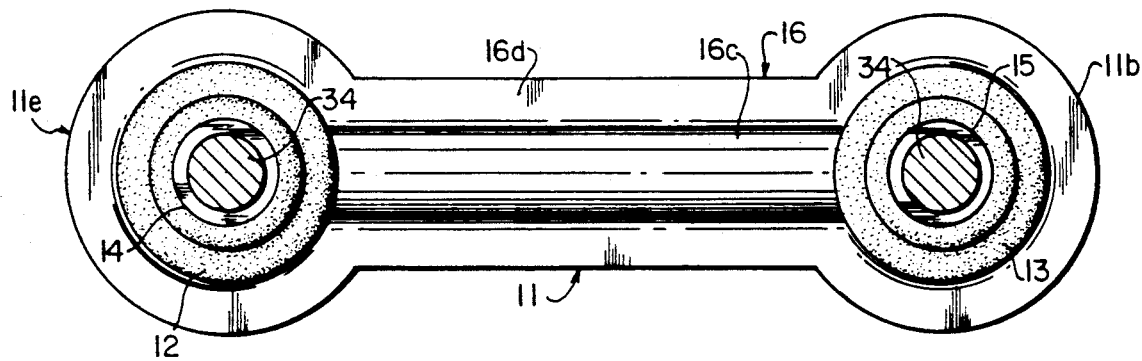
FIG. 2 is a top plan view of the link assembly shown in FIG. 1.

The rigid member further is formed of a pair of similarly configured, co-extensively disposed sections 16 and 17 which are mated together to form the rigid member. Section 16 includes a pair of spaced head portions 16a and 16b, an intermediate, connecting portion 16c and a mating flange portion 16d extending about a periphery of section 16 as best shown in FIG. 2. Head portions 16a and 16b are laterally offset and are provided with bushing receiving openings 16e therethrough having axes disposed substantially parallel relative to each other. Similarly, section 17 includes a pair of spaced head portions 17a and 17b which are comparable to head portions 16a and 16b, respectively, an intermediate connecting portion 17c comparable to intermediate, connecting portion 16c and a peripheral flange 17d comparable to peripheral flange 16d. Also, head portions 17a and 17b are laterally offset similar to head portions 16a and 16b, are provided with bushing receiving openings 17e similar to openings 16e, and the axes thereof are disposed parallel to each other.

Essentially, sections 16 and 17 have identical configurations with section 17 having been inverted and reoriented 180° to mate with section 16 so that peripheral flange 17d is co-extensive with and mates with peripheral flange 16d, head portion 17b of section 17 mates with head portion 16a of section 16 so that the openings 16e and 17e therein register to provide bushing receiving opening 11a for receiving and seating bushing 12 and head portion 17a of section 17 mates with head portion 16b of section 16 so that openings 16e and 17e therein register to provide bushing receiving opening 11a for receiving and seating bushing 13.

Figure 3:
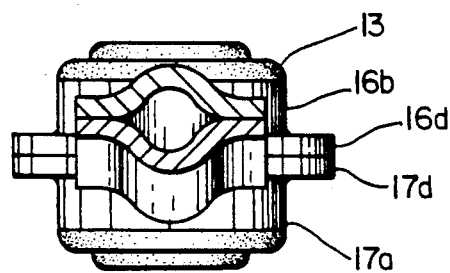
FIG. 3 is a vertical cross-sectional view taken along line 3—3 in FIG. 1.

The rigid member preferably is made of steel and is formed by mating a pair of identical sections 16 and 17 and rigidly securing them together, preferably by spot welding the flange portions thereof together as shown in FIG. 3. The sections 16 and 17 may be formed by casting but preferably by stamping for most applications. In either instance, only a single molding pattern or stamping die would be required since sections 16 and 17 are identical in configuration.

Each of the bushings consists of a body of internally lubricated thermoplastic polyurethane material. The body is provided with an annular recess 18 having a bottom cylindrical wall surface 19. The diameter of cylindrical wall surface 19 is substantially the same as the inside diameter of the opening in a head segment so that the bushing may be force fit into such opening to position the bushing in a head segment as shown in FIG. 1. In inserting the bushing in the head segment, the resilient nature of the bushing would allow either of the annular portions 20 and 21 thereof to deflect and pass through the opening in the head segment to snap the bushing in place within the head segment. The diameter of cylindrical surface 19 may be formed the same or slightly smaller than the diameter of the opening 11a in the head segment to facilitate the insertion of the bushing into the head segment and to provide a snug or loose fit of the bushing within the head segment as desired.

Each of the sleeve members 14, 15 consists of a seamless steel tube received within the opening in a bushing and is adapted to receive a connectable member 34 such as a pin, bolt or stud of another component to which the link assembly is to be connected or mounted. The sleeve member 14, 15 has an outside diameter slightly greater than the diameter of the internal cylindrical wall 22 of the bushing so that the sleeve member can be force fit into the bushing to secure it firmly. Preferably, the sleeve member has a hardness of 32–40 Rockwell C and is nickel plated.

As shown in FIG. 1, interior cylindrical wall 22 of each bushing is provided with a plurality of dimples 23. Preferably, the dimples are uniformly distributed throughout the interior cylindrical wall to provide a sufficient footprint of the bushing to uniformly distribute the loading on the sleeve member. In addition, outer and inner surfaces 19 and 22 of each bushing are provided with a lubricant 32 such as a mineral oil to facilitate displacement of mating surfaces and avoid squeaking of the assembly.

Preferably, each bushing is formed of a polyester based thermoplastic polyurethane material internally lubricated with a mineral oil, having a hardness of 38 Shore D±5.

The high abrasion resistance of the bushings eliminates the necessity of bonding the bushings to the head segments. In addition, the high abrasion resistance of the bushings and the lubricated surfaces 19 and 22 permit the sleeve members to rotate freely within the bushings and the bushings to rotate freely within the head segments. During rotary motion of the link assembly, each sleeve member simply turns and the type of internal stress characteristic of rubber bushings is never created. The functional superiority of the thermoplastic polyurethane material also permits the use of shorter bushings and housings for the bushings which allows greater conical deflection of the link assembly relative to the component to which it is connected.

In the manufacture of the link assembly as described, the rigid member sections preferably are formed with a single stamping tool, the bushings are injection molded and the sleeve members are formed from tubular stock and preferably nickel plated. The rigid member is formed by mating a pair of identically configured sections 16 and 17 as shown in FIG. 1 and rigidly securing such sections together by spot welding the flanges thereof about their peripheries as shown in FIG. 3. The bushings are then force fit into the head sections of the rigid member in the manner as previously described, and finally the sleeve members are force fit into the inserted bushings to complete the assembly. In inserting the bushings and sleeve members, a lubricant 32, preferably a mineral oil, is applied to the surfaces to allow free rotation of the bushings relative to the rigid member and the sleeve members relative to the bushings.

The link assembly as described is not only economical to manufacture but provides a rigid and effective link assembly suitable for use in a wheel suspension system of a vehicle, capable of load transmission, rotary motion and conical deflection.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A link assembly connectable to a pair of connectable members and adapted for rotary motion and conical deflection relative to each of said connectable members, said link assembly comprising:

an elongated, rigid member having a pair of spaced head segments interconnected by an intermediate segment, each of said head segments having connectable member receiving opening therethrough for receiving one of said pair of connectable members therein, said rigid member further including a pair of identically configured, co-extensively disposed sections mated and rigidly secured together, each of said pair of sections including a pair of spaced head portions interconnected by an intermediate portions, each of said pair of head portions having an opening therethrough registered with an opening of an adjoining head portion of the other of said pair of sections to provide the connectable member receiving opening of one of said head segments; and a pair of bushings, each disposed in one of the connectable member receiving openings in the head segments of said elongated rigid member, each of said pair of bushings being formed of a thermoplastic polyurethane material and having an internal cylindrical wall within which the pair of connectable member are received, said cylindrical wall having a plurality of dimples.

2. A link assembly according to claim 1 wherein each of the connectable member receiving openings of said head segments includes an axis, the axes being disposed parallel relative to each other.

3. A link assembly according to claim 1 wherein each of the connectable member receiving openings of said head segments includes an axes, the axes being disposed in non-parallel relation to each other.

4. A link assembly according to claim 1 wherein said head segments are laterally offset relative to each other.

5. A link assembly according to claim 1 wherein said rigid member sections are formed of steel.

6. A link assembly according to claim 1 wherein said rigid member sections are formed by stamping.

7. A link assembly according to claim 1 wherein said rigid member sections include mating flanges secured together.

8. A link assembly according to claim 7 wherein said mating flanges are welded together.

9. A link assembly according to claim 7 wherein said mating flanges extend about a periphery of said rigid member.

10. A link assembly according to claim 9 wherein said mating flanges are spot welded together.

11. A link assembly according to claim 1 wherein each of said bushings includes an external, annular recess adapted to receive a portion of said head segment therein when said bushing is inserted in the connectable member opening of said head segment.

12. A link assembly according to claim 1 wherein said bushing is internally lubricated.

13. A link assembly according to claim 1 wherein said dimples in said interior cylindrical wall of each of said bushings are dispersed uniformly therein.

14. A link assembly according to claim 1 further comprising a rigid sleeve member disposed within each bushing for receiving one of said connectable members therein.

15. A link assembly according to claim 14 wherein said sleeve member comprises a seamless steel tube.

16. A link assembly according to claim 14 including a lubricant disposed between each bushing and an adjoining head section and between each sleeve member and an adjoining bushing.

17. A link assembly according to claim 16 wherein said lubricant is a mineral oil.

18. A link assembly according to claim 1 wherein each of said bushings is formed of a polyester based thermoplastic polyurethane material.

* * * * *